Sept. 27, 1949.  H. STUKART  2,482,991
MEAT TENDERING MACHINE
Filed Nov. 25, 1943  3 Sheets-Sheet 2

Inventor
Hendrik Stukart
By Spencer, Marzall, Johnston & Cook
Attys

Sept. 27, 1949.  H. STUKART  2,482,991
MEAT TENDERING MACHINE
Filed Nov. 25, 1943  3 Sheets-Sheet 3
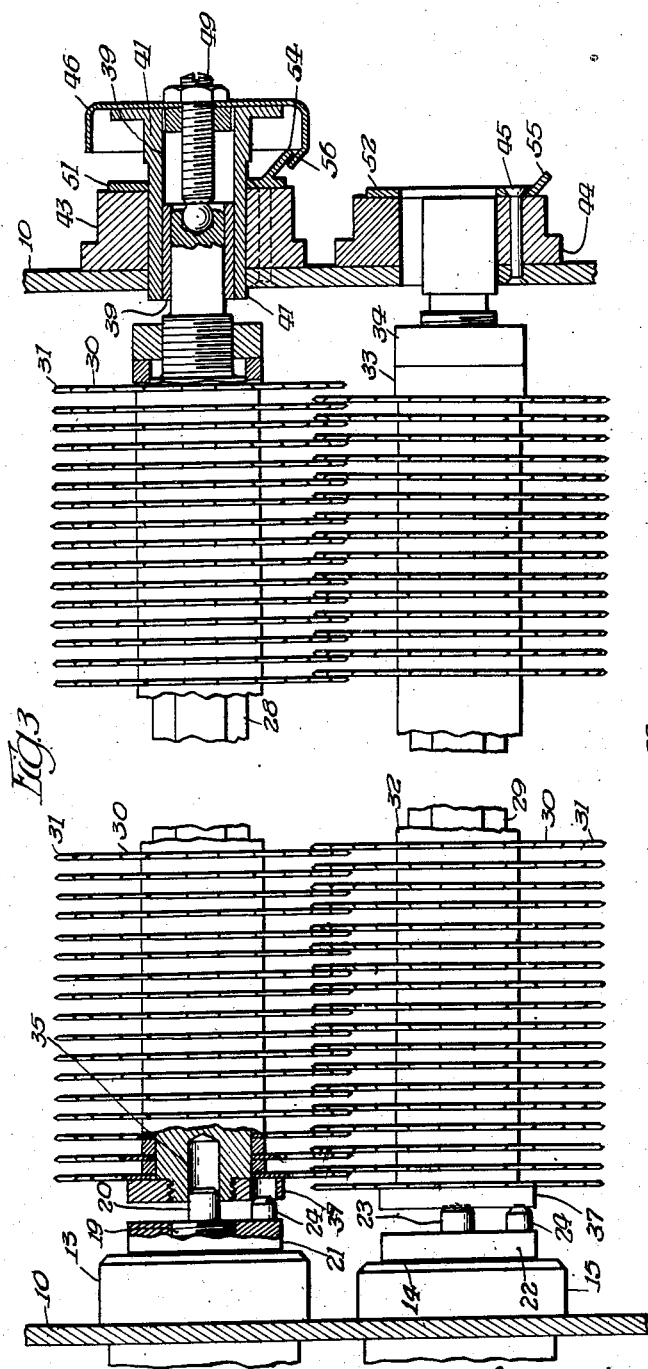
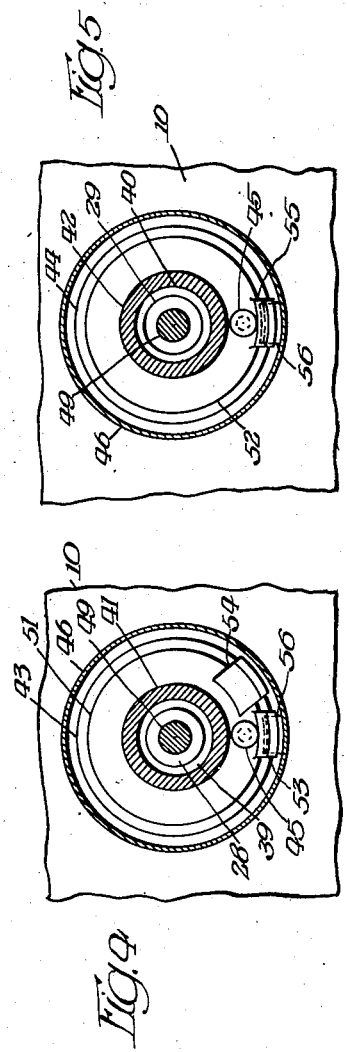
Inventor
Hendrik Stukart
By Spencer, Marzall, Johnston & Cook
Attys Patented Sept. 27, 1949

2,482,991

UNITED STATES PATENT OFFICE 2,482,991

MEAT TENDERING MACHINE

Hendrik Stukart, La Porte, Ind., assignor to U. S. Slicing Machine Company, Inc., a corporation of Indiana Application November 25, 1943, Serial No. 511,657

4 Claims. (Cl. 17—26)

This invention relates to meat tendering machines, and specifically to meat tendering machines having a plurality of tendering knife assemblies.

It is customary, in meat tendering machines of the type above described, to remove all of the knife assemblies simultaneously and to insert them simultaneously. The simultaneous removal of a plurality of knife assemblies is ordinarily quite dangerous to the operator in that a plurality of knife assemblies is difficult to handle without cutting oneself. In addition, the simultaneous insertion of a plurality of knife blade assemblies is both difficult and dangerous. It is difficult because ordinarily the assemblies must be carefully and accurately alined, and it is dangerous again because of the possibility of cutting oneself. The invention very easily eliminates both of these problems.

An important object of the present invention is to provide new and improved mechanism co-operating with knife blade assemblies for meat tendering machines so that the knife assemblies may be removed readily and quickly one at a time.

Another important object of the invention is the provision of new and improved means for mounting overlapping knife assemblies for meat tendering machines so that a single knife assembly may be removed by the mere manual operation of an element which preferably constitutes a removable bearing for a knife assembly, so that one assembly may be first axially shifted a predetermined distance without in any way removing the other assembly from its bearing, the first assembly then being capable of further axial movement so as to remove it clear of its bearings, while the manipulation of a second element, which preferably constitutes a bearing for the second knife assembly, will permit independent removal of the second knife assembly.

Numerous other objects and advantages will become apparent throughout the progress of the following specification.

The accompanying drawings illustrate one embodiment of a device incorporating the features of the present invention in which:

Fig. 3 is similar to Fig. 2 but shows the knife blade assemblies further disassembled;

Fig. 4 is a detail section on the line 4—4 of Fig. 1; and

Fig. 5 is a detail section on the line 5—5 of Fig. 1.

Figure 1:
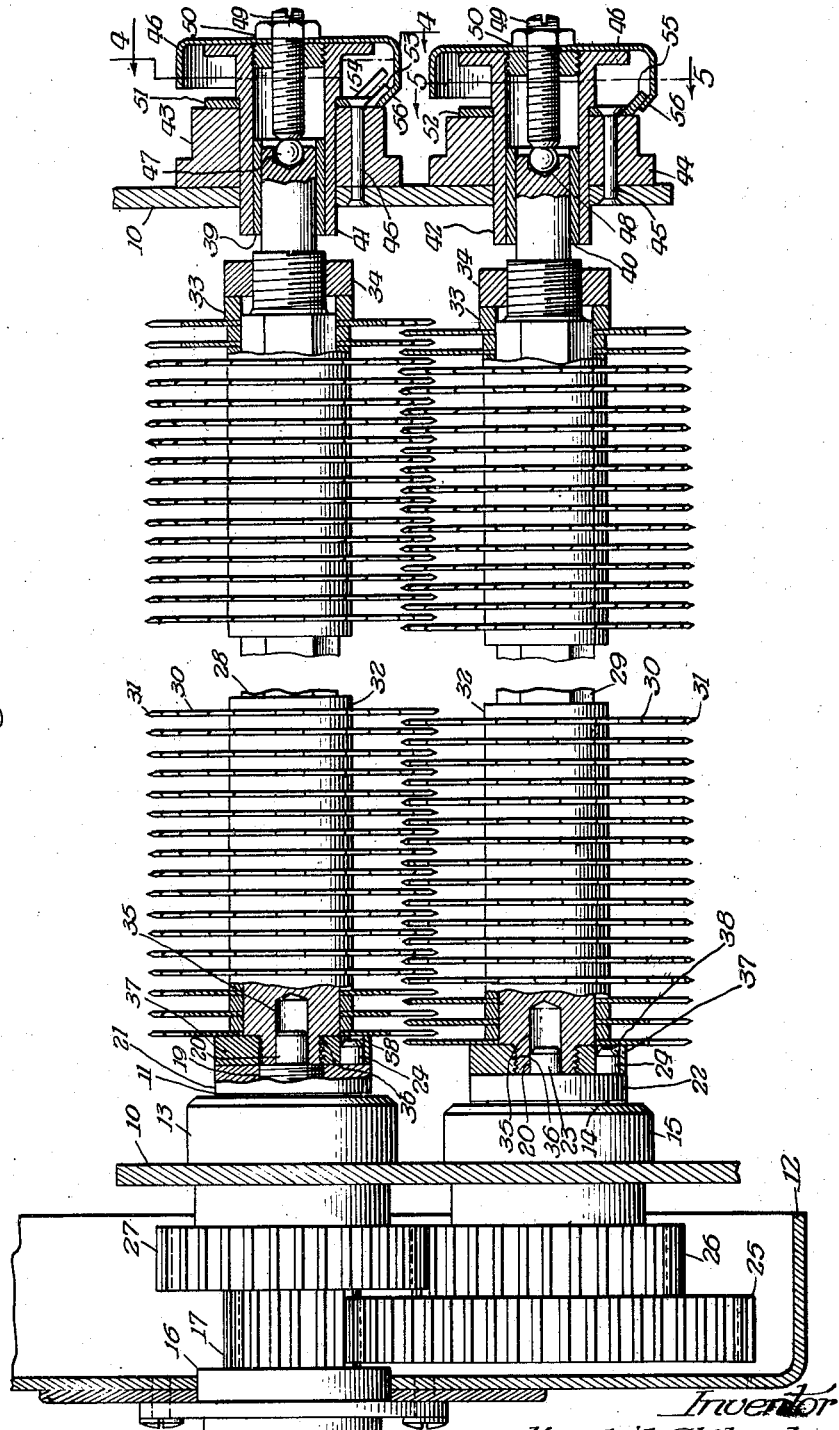
Fig. 1 is a detail plan view, partially in section, of the knife blade assemblies in normal position in a meat tendering machine incorporating the present invention, and shows some of the parts in section for greater clarity.

The particular device herein disclosed for the purpose of illustrating the invention is shown adapted to the knife blade assemblies of a meat tendering machine of the type shown in co-pending application Serial No. 455,561, filed August 21, 1942, which has issued as Patent No. 2,409,463 on October 15, 1946, and assigned to the present assignee.

The food tendering machine with which the present invention may be used may be of the type disclosed in the aforesaid co-pending application, and includes a pair of upwardly extending spaced end brackets 10 which generally form mounting brackets for most of the operating mechanism of the food tendering machine.

Knife driving mechanism

A rear knife driving shaft 11 is operatively connected with the drive motor of the machine through suitable belts to a pulley 12. The shaft 11 is journaled in a rear pulley shaft bearing 13 which is horizontally disposed in the upper portion of the left hand bracket 10. A second knife driving shaft 14 has its axis parallel to the axis of the shaft 11 and is journaled in a bearing 15 which is also horizontally disposed in the upper portion of the left hand bracket 10 but which is spaced forwardly from and somewhat above the bearing 13. The pulley 12 is loosely and rotatably mounted upon the outer left hand portion of the shaft 11, the shaft 11 being provided with a pulley hub 16. A pinion 17 is secured to the hub 16 and is also rotatably mounted upon the shaft 11. Outward sliding movement of the pulley 12 and the pinion 17 is restricted by a washer 18 which is securely fastened to the left end of the shaft 11 by any suitable means.

The outer surface of the shaft 11, near its right end at 19, is threaded and an axially extending pin 20 is seated in or secured to the shaft at its inner end. A rear knife assembly drive collar 21 is secured upon the threaded portion of the shaft 11 and is so positioned as to abut and bear against the inner end of the shaft bearing 13 to aid in maintaining the shaft 11 against sliding movement in the bearing 13.

The inner right end of the front knife shaft 14 is provided with a front knife assembly drive collar 22 and an axially extending pin 23 corresponding to the pin 20. Each of collars 21 and 22 is provided with a driving pin 24 which is spaced radially from and extends in a direction parallel with that of the pins 20 and 23. A large gear 25 and a small gear 26 are secured together and are suitably mounted upon the front knife shaft 14, preferably by means of mating splines. A pinion 27 is fixedly mounted upon the rear shaft 11 and is adapted to rotate therewith. The pinions 17 and 27 and the gears 25 and 26 are respectively so positioned that the gear 25 meshes with the pinion 17 and the gear 26 meshes with the pinion 27.

The driving mechanism is from the source of power for the machine to the pulley 12 which, together with the pinion 17 attached thereto, revolves freely on the shaft 11. The pinion 17 meshing with the gear 25 drives the shaft 14 and the gear 26, the ratio of the pinion 17 and the gear 25 determining the speed of the shaft 14 and the gear 26. The gear 26 drives the pinion 27 and the shaft 11, the speed of which further depends on the ratio of the gear 26 and the pinion 27. The shafts 11 and 14 obviously rotate in opposite directions, and the direction of rotation of the pulley 12 and the arrangement of parts is such that the shafts 11 and 14 not only rotate in opposite directions but ordinarily rotate toward each other downwardly.

Knife blade assemblies

The knife drive mechanism just described is used to rotate a plurality of knife blade assemblies mounted upon a rear hexagonal knife shaft 28 and a front hexagonal knife shaft 29, respectively. A plurality of cutting knives 30 are provided with peripheral, tendering teeth or cutting edges 31 and are assembled and mounted on the shafts 28 and 29 for rotation therewith. A plurality of spacing collars 32 are assembled and mounted on the shafts 28 and 29 alternately with the circular cutting knives 30 to maintain the knives in proper spaced relation. The knives 30 are so arranged that when the shafts 28 and 29 are in operating position, each knife 30 of one shaft, except in an end position, will be disposed opposite a spacing collar 32 and extend between and in a plane intermediate and substantially parallel to the respective planes of two adjacent knives on the other shaft. The left end of each of the shafts 28 and 29 is provided with an external thread 36 adapted to receive internally threaded collars 37. The assembled knives 30 and collars 32 are tightly secured together against each collar 37 by a washer 33 mounted on each shaft near its right hand end and a nut 34 threaded thereon.

Knife blade assembly mountings

Rear and front hexagonal knife shafts 28 and 29 are operatively connected to the shafts 11 and 14, respectively, through the collars 21 and 22, the pins 20 and 23, and the driving pins 24. These hexagonal knife shafts 28 and 29 have parallel axes and are each provided with a centrally disposed axially extending hole 35 adapted to respectively receive the pins 20 and 23. Each collar 37 on the shafts 28 and 29 is provided with a plurality of circumferentially disposed spaced holes 38 adapted to receive the driving pin 24, a plurality of holes being provided to facilitate mounting of the shafts in operating position.

The right ends of shafts 28 and 29 are provided with bearings 39 and 40, respectively. The bearings 39 and 40 are journaled within sleeves 41 and 42, respectively, which are mounted within bearings 43 and 44, respectively. The bearings 43 and 44 are securely fastened against rotation to the right end bracket 10, preferably by means of rivets 45. Each of the sleeves 41 and 42 has a knob 46 provided with means to hold each sleeve within its respective bearing. The bearings 39 and 40 are in axial alinement with the bearings 13 and 15, respectively, and thus secure the hexagonal knife shafts 28 and 29 in suitable parallel relation.

An adjustable thrust bearing is provided for each of the shafts 28 and 29. This thrust bearing comprises bearings 47 and 48, respectively, which are arranged to engage the right ends of the shafts 28 and 29 and to bear against adjusting screws 49 provided in knobs 46. Each of the screws 49 is locked in position by nuts 50.

The above mechanism has been described solely for the purpose of illustrating an example of a type of environment in which the present invention may be used, and naturally the environment is subject to such changes and alterations as may appear feasible and desirable to the person using the within invention. The novelty of the disclosure consists mainly in the method which is provided to remove and reinstall the knife assemblies upon shafts 28 and 29 individually with respect to the rest of the machine.

Blade assembly removal mechanism

Figure 2:
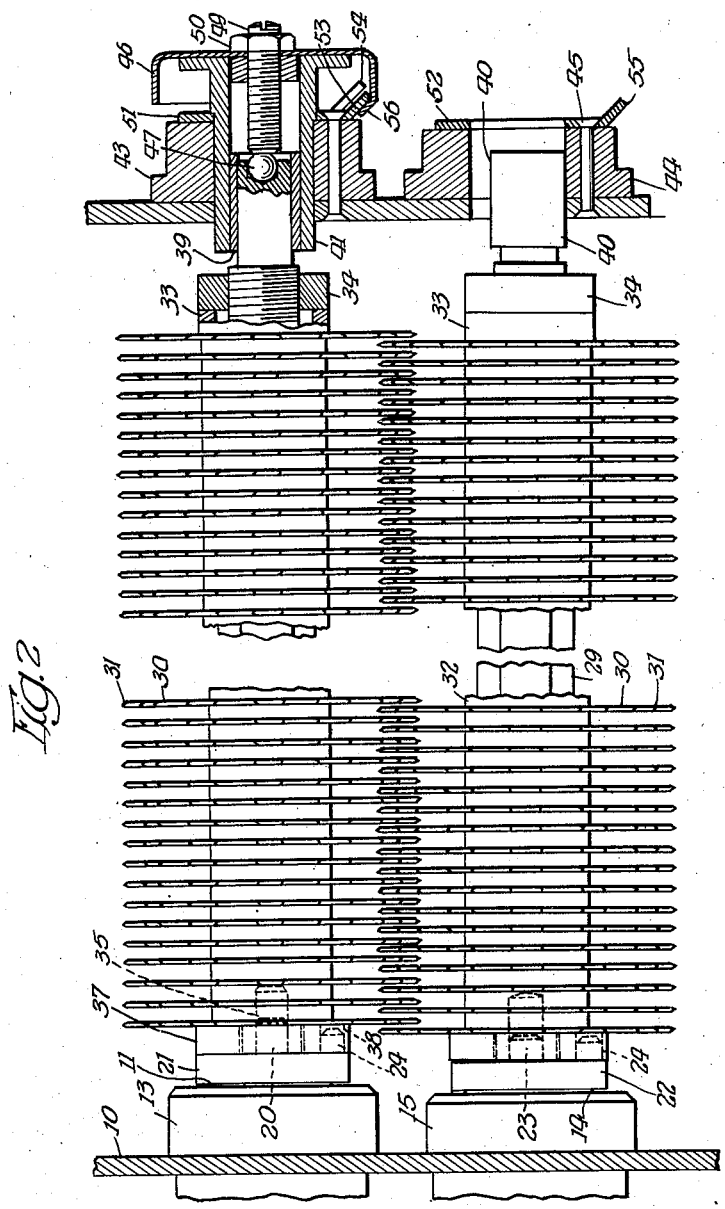
Fig. 2 is similar to Fig. 1 but shows the knife blade assemblies in a partially disassembled relation.

A rear locking ring 51 and a front locking ring 52 are respectively secured to the bearings 43 and 44 with the same rivets 45 which are used to secure the bearings to the end bracket 10 of the food tendering machine. The rear locking ring 51, Fig. 4, is provided with two lips 53 and 54. Lips 53 and 54 extend axially from the rear locking ring 51 and are slanted with respect to the plane of the locking ring. Lip 54 is spaced angularly from lip 53 and, in addition, its plane is spaced outwardly from the plane of the lip 53. The front locking ring 52, Fig. 5, is provided with a lip 55 which is similar to the lip 53 on the locking ring 51. Each knob 46 is provided with a lug 56 which is adapted to co-operate with the lips on its respective locking ring. By turning the knobs 46 the respective lugs 56 are disengaged from the respective lips on the locking rings to permit withdrawal of the bearings and the knife blade assemblies in the following sequence:

Starting with the machine in its fully assembled condition illustrated in Fig. 1, the front knife shaft 29 may be removed by turning the front knob until lug 56 is disengaged from lip 55 on locking ring 52. The front knob is then removed from the machine by moving it outwardly, whereupon the parts of the machine will assume the position illustrated in Fig. 2. Then the rear knob is rotated until lug 56 on the knob disengages the lip 53 on the locking ring 51, and the knob is pulled outwardly until the lug 56 stops against the lip 54 on the rear locking ring. The relation between the lugs and the lips is preferably such that both blade shafts will move in an outward direction about $\tfrac{1}{16}$ of an inch to the position illustrated in Fig. 3, wherein the rear shaft 28 will stop against the adjusting screw 49 but will still be resting on the axially extending pin 20. The front knife shaft 29 in this position will clear its axially extending pin 23 and can be removed from the machine.

After the front knife shaft has been removed, then the rear shaft 28 may be removed by turning the rear knob until the lug 56 on the knob disengages the lip 54 on the locking ring 51, and by subsequently removing the rear knob from the machine by moving it outwardly. The rear knife shaft 28 may then be moved to the right until it clears the axial pin 29, whereupon it may readily be removed from the machine.

To re-assemble the knife assemblies within the meat tendering machine the procedure above described is reversed.

The mechanism just described provides a simply constructed and easily operable means for removing and assembling the knife assemblies individually and considerably lessens the danger to the operator arising from attempting to handle a plurality of knife assemblies simultaneously. Ordinarily the cutting edges of such assemblies are very sharp and it is obviously dangerous to handle more than one at a time. In addition, the problems of alinement are eliminated when the assemblies may be installed separately within the machine. The disclosed mechanism may be applied readily to meat tendering machines of the type herein disclosed and to machines of similar types.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a meat tendering machine having two knife blade assemblies and embodying means for removably securing said knife blade assemblies for independent removal and installation including an adjustable and demountable support for one of said knife blade assemblies, a demountable support for the other knife blade assembly locking lug means carried by each of said demountable supports, locking lip means carried by the machine and adapted to co-operate with the locking lug means carried by one of said supports, whereby to maintain one of said demountable supports in different adjusted positions, and locking lip means carried by the machine and adapted to co-operate with the locking lug means carried by the other one of said supports.

2. A meat tendering machine comprising a frame, knife assemblies carried by said frame and including a plurality of shafts having knives spaced on the shafts, the knives on one shaft on one side thereof fitting between the knives on another shaft on an adjacent side thereof, drive means for one end of each shaft, a bearing for the other end of each shaft, means for mounting each of said bearings on said frame for movement axially of the shaft, means associated with each bearing for locking the movable bearings in said frame, the release of one of said locking means permitting one of said knife assemblies to be shifted axially a predetermined distance while the other knife assembly is supported at both ends, and the release of the other locking means permitting the other knife assembly to be moved axially to release the first said knife assembly to permit removal thereof, and means associated with said other locking means for limiting the axial movement of said other knife assembly while said first knife assembly is being removed.

3. A meat tendering machine comprising a frame, knife assemblies carried by said frame and including a plurality of spaced shafts having knives spaced on the shafts, the knives on one shaft on one side thereof fitting between the knives on another shaft on an adjacent side thereof, drive means for one end of each shaft, a bearing for the other end of each shaft, means for removably mounting each of said bearings in said frame, means associated with each bearing for locking the removable bearings against removal from said frame, and stop means associated with one of the locking means, the release of one of said locking means permitting removal of the bearing associated therewith and axial shifting of one of said knife assemblies a predetermined distance while the other knife assembly is supported at both ends thereof, and the release of the other locking means permitting axial movement of another of said knife assemblies a predetermined distance to said stop means to release the first said assembly to permit removal thereof, and thereafter permitting removal of the bearing associated with said last named locking means to allow axial movement of said other knife assembly for removal thereof.

4. A meat tendering machine comprising a frame, knife assemblies carried by said frame and including a plurality of spaced shafts having knives spaced on the shafts, the knives on one shaft on one side thereof fitting between the knives on another shaft on an adjacent side thereof, drive means for one end of each shaft, a bearing for the other end of each shaft, means for removably mounting each of said bearings in said frame, locking means for each bearing for retaining the knife assemblies in operative position, and means associated with one of said locking means to retain it in an intermediate position between its locked and unlocked positions, the removal of one of said bearings permitting axial shifting of the assembly associated therewith a predetermined distance, movement of the other locking means to intermediate position permitting axial movement of the other assembly a predetermined distance and enabling further axial movement and complete removal of the first assembly, and movement of said other locking means to unlocked position permitting further axial movement and complete removal of said other assembly.

HENDRIK STUKART.

REFERENCES CITED

The following references are of record in the file of this patent:

UNITED STATES PATENTS

| Number | Name | Date |
| --- | --- | --- |
| 50,921 | Doyle | Nov. 14, 1865 |
| 532,858 | Baum | Jan. 22, 1895 |
| 1,700,101 | Smith | Jan. 22, 1929 |
| 1,986,076 | Spang | Jan. 1, 1935 |
| 2,006,404 | Merwin | July 2, 1935 |
| 2,113,598 | Mueller | Apr. 12, 1938 |
| 2,291,809 | Jackson | Aug. 4, 1942 |
| 2,364,533 | Jackson | Dec. 5, 1944 |
| 2,409,463 | Arhndt | Oct. 15, 1946 |

FOREIGN PATENTS

| Number | Country | Date |
| --- | --- | --- |
| 504,044 | Germany | Aug. 18, 1930 |